(12) United States Patent
Galstian

(10) Patent No.: US 10,809,138 B2
(45) Date of Patent: Oct. 20, 2020

(54) FIBER-OPTIC THERMOMETER

(71) Applicant: UNIVERSITE LAVAL, Quebec (CA)

(72) Inventor: Tigran Galstian, Quebec (CA)

(73) Assignee: UNIVERSITÉ LAVAL, Quebec (CA)

( * ) Notice: Subject to any disclaimer, the term of this patent is extended or adjusted under 35 U.S.C. 154(b) by 905 days.

(21) Appl. No.: 15/315,960

(22) PCT Filed: Jun. 5, 2014

(86) PCT No.: PCT/CA2014/050519
§ 371 (c)(1),
(2) Date: Dec. 2, 2016

(87) PCT Pub. No.: WO2014/194426
PCT Pub. Date: Dec. 11, 2014

(65) Prior Publication Data
US 2017/0131157 A1  May 11, 2017

Related U.S. Application Data

(60) Provisional application No. 61/832,854, filed on Jun. 8, 2013.

(51) Int. Cl.
*G01K 11/00* (2006.01)
*G01K 11/32* (2006.01)

(52) U.S. Cl.
CPC ......... *G01K 11/3206* (2013.01); *G01K 11/00* (2013.01)

(58) Field of Classification Search
CPC combination set(s) only.
See application file for complete search history.

(56) References Cited

U.S. PATENT DOCUMENTS

| | | |
|---|---|---|
| 4,201,446 A | 5/1980 | Geddes et al. |
| 4,203,326 A | 5/1980 | Gottlieb et al. |
| 4,278,349 A | 7/1981 | Sander |
| 4,288,159 A | 9/1981 | Newman |
| 4,295,739 A | 10/1981 | Meltz et al. |
| 4,437,761 A | 3/1984 | Kroger et al. |

(Continued)

FOREIGN PATENT DOCUMENTS

| | | |
|---|---|---|
| CN | 102901581 A | 1/2013 |
| EP | 0061884 A1 | 10/1982 |

(Continued)

OTHER PUBLICATIONS

Gottlieb, Milton, and G. B. Brandt. "Temperature sensing in optical fibers using cladding and jacket loss effects." Applied optics 20.22 (1981): 3867-3873.

(Continued)

*Primary Examiner* — Lisa M Caputo
*Assistant Examiner* — Nasir U. Ahmed
(74) *Attorney, Agent, or Firm* — Anglehart et al.

(57) ABSTRACT

A fiber-optic thermometer probe has an optical fiber with a sensing portion, namely a region of reduced cladding thickness coated with a temperature-dependent refractive index material to provide variations in propagated light power upon changes in temperature in a vicinity of the sensing portion. A reflective interface optically coupled to a core of the optical fiber reflects light propagated therein. The sensing portion can be the tip and prepared by etching using a dipping process.

19 Claims, 17 Drawing Sheets

(56) References Cited

U.S. PATENT DOCUMENTS

| | | |
|---|---|---|
| 4,523,092 A | 6/1985 | Nelson |
| 4,708,494 A | 11/1987 | Kleinerman |
| 4,974,932 A | 12/1990 | Nattermann |
| 5,004,913 A | 4/1991 | Kleinerman |
| 5,042,980 A | 8/1991 | Baker et al. |
| 5,058,420 A | 10/1991 | Vali et al. |
| 5,168,156 A | 12/1992 | Fischer et al. |
| 5,191,206 A | 3/1993 | Boiarski et al. |
| 5,235,179 A | 8/1993 | Chang et al. |
| 5,239,176 A | 8/1993 | Stevenson |
| 5,283,429 A | 2/1994 | Campolo |
| 5,290,103 A | 3/1994 | Fevrier et al. |
| 5,627,921 A | 5/1997 | Lidgard et al. |
| 5,696,863 A | 12/1997 | Kleinerman |
| 5,803,607 A * | 9/1998 | Jones .................. G01K 13/02 374/121 |
| 5,928,222 A | 7/1999 | Kleinerman |
| 6,072,922 A | 6/2000 | Albin et al. |
| 6,115,519 A | 9/2000 | Espindola |
| 6,985,656 B2 | 1/2006 | Iazikov et al. |
| 7,158,291 B2 | 1/2007 | Saini et al. |
| 7,762,720 B1 | 7/2010 | Zhu et al. |
| 7,773,847 B2 | 8/2010 | Negishi et al. |
| 7,839,901 B2 | 11/2010 | Meleshkevich et al. |
| 8,175,437 B2 | 5/2012 | Bickham et al. |
| 8,195,013 B2 | 6/2012 | Lagakos et al. |
| 8,406,592 B2 | 3/2013 | Abbott |
| 8,463,083 B2 | 6/2013 | Egalon |
| 9,151,924 B2 | 10/2015 | Balasubramaniam et al. |
| 2004/0047535 A1 | 3/2004 | Ukrainczyk |
| 2005/0074208 A1 | 4/2005 | Badcock et al. |
| 2005/0238312 A1* | 10/2005 | Meder .................. C03C 8/245 385/137 |
| 2008/0144698 A1* | 6/2008 | Cloutier ................ G01D 5/268 374/161 |
| 2010/0296771 A1 | 11/2010 | Weynant et al. |
| 2012/0065494 A1* | 3/2012 | Gertner ................ A61B 5/055 600/411 |
| 2012/0262938 A1* | 10/2012 | Price .................... G02B 6/262 362/553 |
| 2013/0046357 A1* | 2/2013 | Neev .................... A61N 5/022 607/45 |
| 2015/0098077 A1 | 4/2015 | Findlay |
| 2015/0316424 A1 | 11/2015 | Bauco |

FOREIGN PATENT DOCUMENTS

| | | |
|---|---|---|
| EP | 0074788 A2 | 3/1983 |
| EP | 0146522 A2 | 6/1985 |
| EP | 0251496 A2 | 1/1988 |
| GB | 2130719 A | 6/1984 |
| JP | S56-112621 A | 9/1981 |
| JP | S63-311307 A | 12/1988 |
| JP | H02-99838 A | 4/1990 |
| WO | WO 88/04415 A1 | 6/1988 |
| WO | WO 2015/017909 A1 | 2/2015 |
| WO | WO 2015/051403 A1 | 4/2015 |

OTHER PUBLICATIONS

Hartog, A. H., A. J. Conduit, and D. N. Payne. "Variation of pulse delay with stress and temperature in jacketed and unjacketed optical fibres." Optical and Quantum Electronics 11.3 (1979): 265-273.

Hidehisa Tazawa et al., Fiber-optic coupler based refractive index sensor and its application to biosensing, Applied Physics Letters 91, 113901 2007.

http://www.phoenixphotonics.com/website/technology/side-polished-fibers.html.

Ivanov, Oleg V., and Ivan V. Zlodeev. "Fiber structure based on a depressed inner cladding fiber for bend, refractive index and temperature sensing." Measurement Science and Technology 25.1 (2014): 015201.

Lv Min et al., Study on Sensor for Solution Concentration and Temperature Based on Fused Tapering Optical Fiber Coupler, Photonics and Optoelectronics (SOPO), 2012 Symposium on Photonics and Optoelectronics (IEEE).

PCT/CA2014/050519 IPRP chapter I.

PCT/CA2014/050519 ISR.

PCT/CA2014/050519 search strategy.

Sameer M. Chandani et al., Fiber-Optic Temperature Sensor Using Evanescent Fields in D Fibers, IEEE Photonics Technology Letters ( vol. 17, Issue: 12, Dec. 2005 ).

Tao, Chunxian, et al. "Fiber-Optic Temperature Sensor Based on Temperature-Dependent Refractive Index of Germanium-Silica Coating Stack." Sensors and Materials 26.10 (2014): 745-751.

EP14807476 supplementary European search report dated Jan. 23, 2018 with related claims.

* cited by examiner

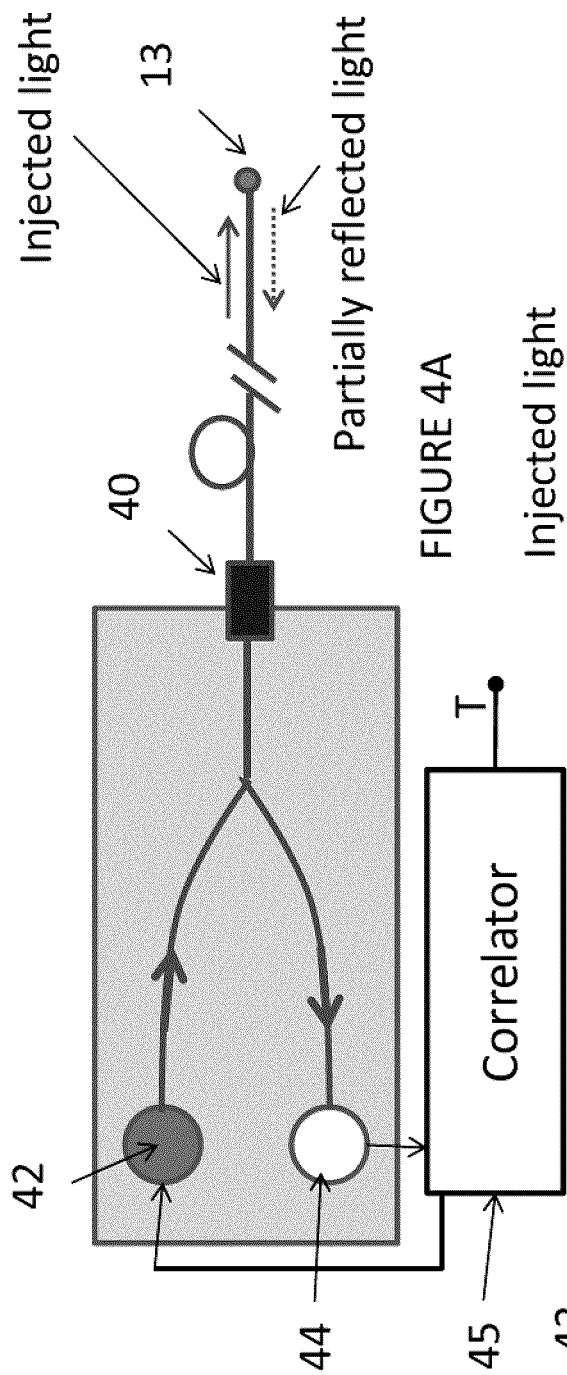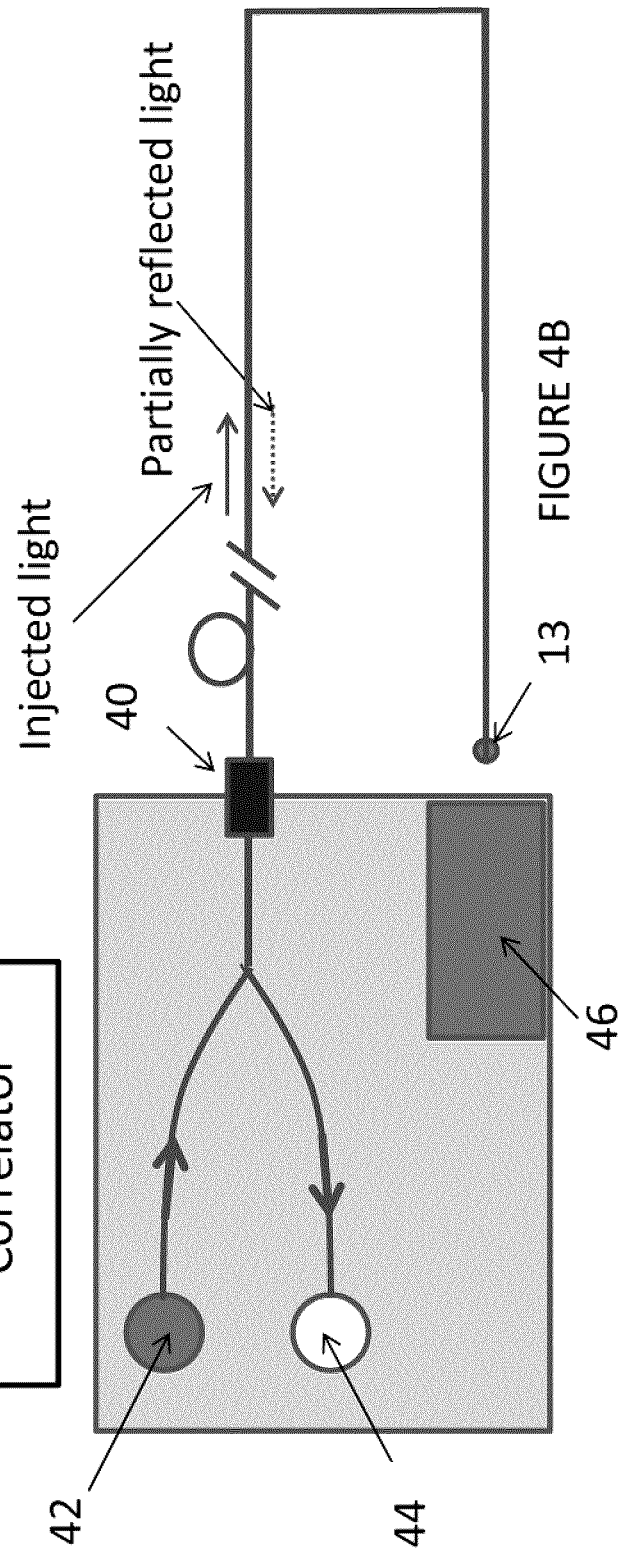
FIGURE 4A
FIGURE 4B

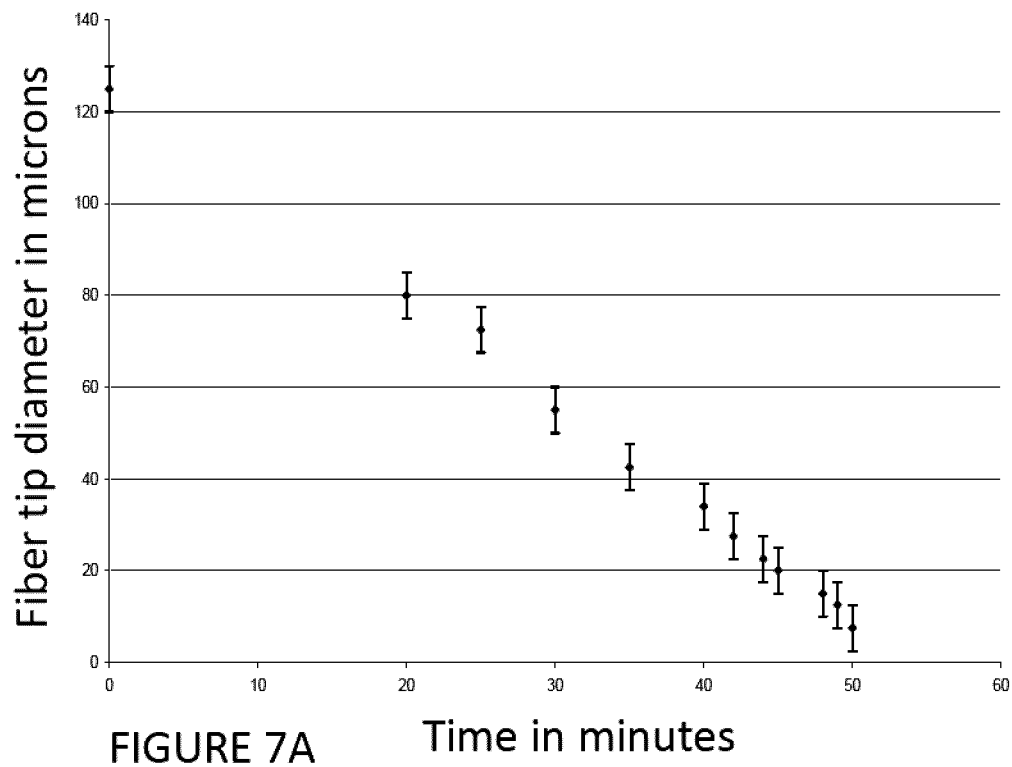
FIGURE 7A   Time in minutes
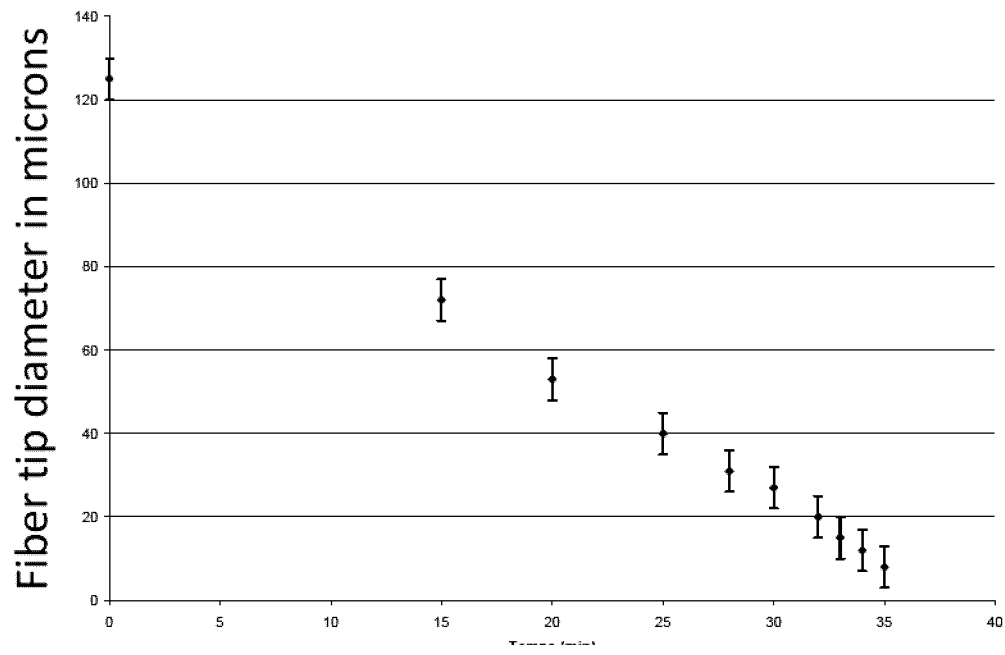
FIGURE 7B   Time in minutes

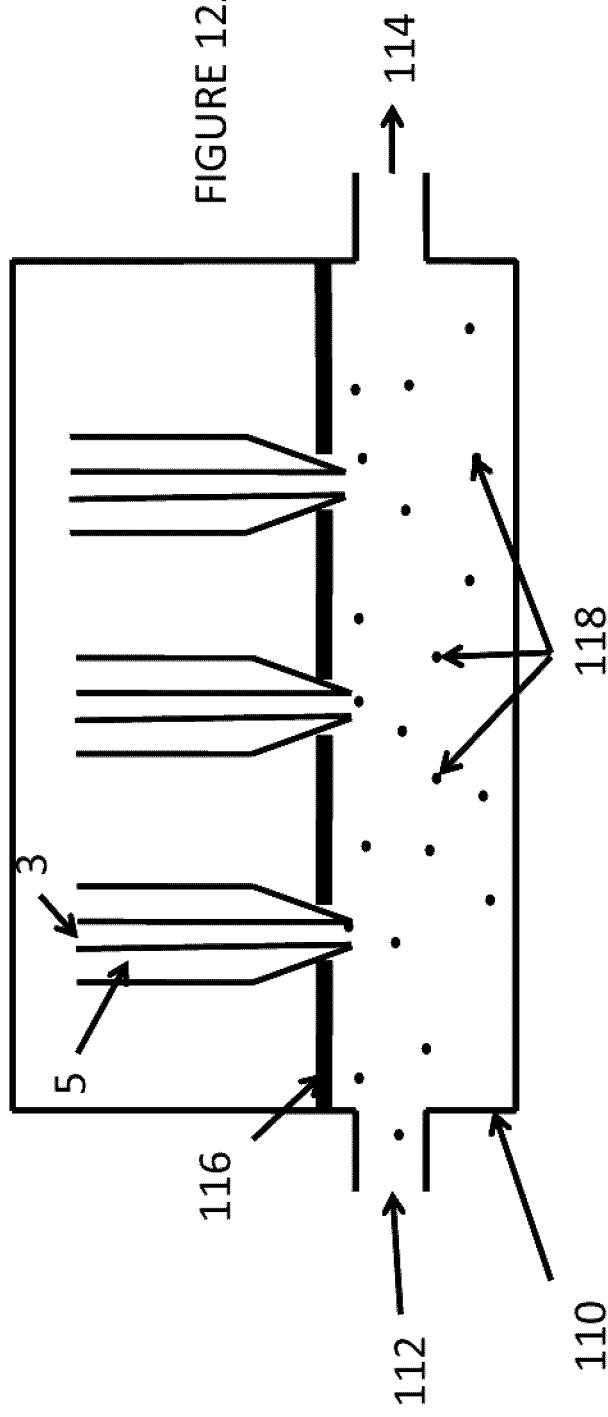
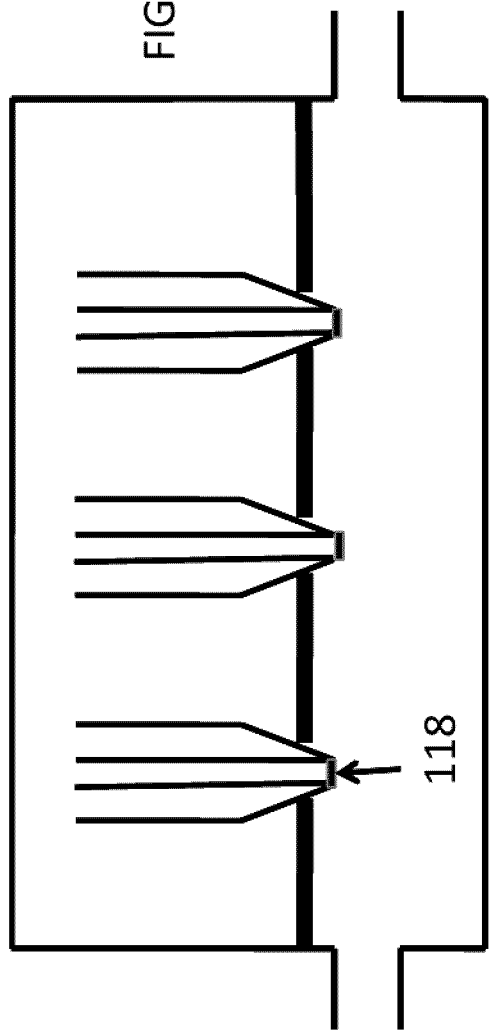

FIBER-OPTIC THERMOMETER

The present application claims priority of U.S. patent application Ser. No. 61/832,854 filed Jun. 8, 2013.

TECHNICAL FIELD

The present invention generally relates to processes and devices using fiber-optic sensors and more particularly to fiber-optic temperature probes.

BACKGROUND OF THE INVENTION

Existing (traditional) thermometers presents a number of disadvantages that limit the scope of their use. For example they often lack mechanical flexibility or they may contain metal or semiconductor elements which are sensitive to electromagnetic fields (EMF) making it difficult or impossible to use them in applications where such fields are present.

Fiber optic technologies have been developed to allow detection of environmental parameters such as temperature. However, existing fiber optic thermometers are largely based on multi-mode fibers (gallium arsenide, etc.), which are sensitive to bending (modal composition) and therefore limit their utilisation in situations where the fiber must be inserted in material or anatomical structures with irregular shapes. Furthermore, existing single-mode fiber thermometers which rely Brillouin Sensors (US patent application 20040208413, Fiber Bragg Gratings (U.S. Pat. No. 6,072,922), precise reflective path length (U.S. Pat. No. 8,195,013) and the like are complex, and therefore costly to make.

Existing fiber optic sensors relying on changes in attenuation of the evanescent field (see U.S. Pat. No. 5,058,420 that describes a liquid level sensor, U.S. Pat. No. 4,203,326) have been developed but optical fiber thermometers typically measure a spectral change with temperature that requires complex reading equipment.

There is therefore a need for simpler, less costly fiber optic thermometers.

SUMMARY OF THE INVENTION

Applicant provides a fiber optic thermometer that is less complicated and less expensive to manufacture and that can be disposable.

In one aspect of the invention there is provided a fiber-optic thermometer probe comprising an optical fiber having a sensing portion with a region of reduced cladding thickness coated with a temperature-dependent refractive index material to provide variations in propagated light power upon changes in temperature in a vicinity of the sensing portion and a reflective interface optically coupled to a core of the optical fiber to reflect light propagated therein.

In another aspect of the invention there is provided a method for making a fiber-optic thermometer comprising: Providing one or more optic fiber with at least one end, the fiber comprising a core and a cladding, removing at least a part of the cladding at the at least one end to provide an evanescent field accessible region, coating the evanescent field accessible region with a temperature dependent refractive index material to produce a sensing portion wherein the step of removing and coating produces a substantially adiabatic geometry, providing a reflective interface at the core at the at least one end.

In yet another aspect there is provided a fiber-optic thermometer comprising one or more optical fiber having a sensing portion with a region of reduced cladding thickness coated with a temperature-dependent refractive index material to provide variations in propagated light power upon changes in temperature in a vicinity of the sensing portion, a photo detector and a light source coupled to the optic fiber probe and a light power to temperature correlator to provide a reading of temperature in an environment.

BRIEF DESCRIPTION OF THE DRAWINGS

The invention will be better understood by way of the following detailed description of embodiments of the invention with reference to the appended drawings, in which:

FIG. 4A shows a schematic representation of an example of the thermometer of an embodiment of the invention, and FIG. 4B shows an embodiment having a calibration chamber.

FIG. 7 A shows a graph of the diameter of a fiber as a function of time in 40% HF at a constant temperature of 20° C.

FIG. 7 B shows a graph of the diameter of a fiber as a function of time in 48% HF at a constant temperature of 20° C.

FIG. 8A shows optic fibers obtained by dipping in 40% HF for 45 minutes while maintaining a constant temperature of 20° C. (the fibers have a minimal diameter of 20 µm), and FIG. 8B shows optic fiber obtained by dipping in 40% HF for 1 hour (with oil) with constant temperature, and the diameter of the fiber goes from 125 µm to 2 µm over a length of 330 µm.

FIG. 10A shows dynamic modeling of a fiber in a 48% HF solution for 70 minutes (with oil) where the fiber was maintained at 3 different positions for approximately 23 minutes, and FIG. 10B shows dynamic modeling of a fiber in a 40% HF solution for 60 minutes (with oil), where the fiber was constantly displaced at a speed of 5 µm/min and the cone length is 160 µm.

FIGS. 12A and 12B show a schematic diagram exemplifying the process of reflective material deposition.

DETAILED DESCRIPTION

The invention provides a fiber optic thermometer the functioning of which is based on the variation of the power of the light propagated within the fiber in response to changes in the refractive index of a temperature-dependent refractive index material. The fiber optic thermometer of the invention is simpler and cheaper to make than existing fiber optic thermometers and provides good temperature and spatial resolution.

Figure 1:
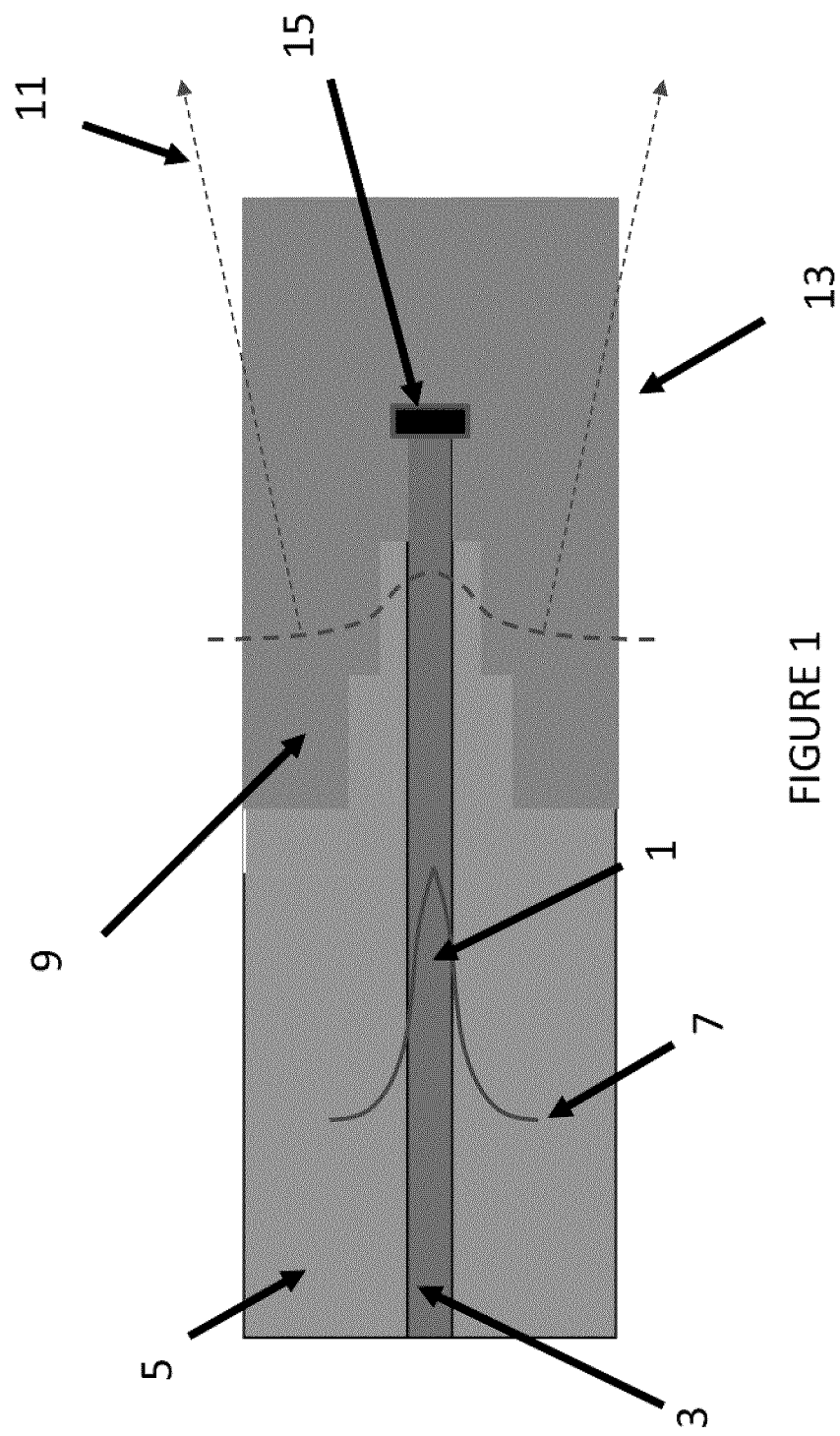
FIG. 1 shows a schematic cross-section representation of an embodiment of the fiber-optic probe of the invention.

The thermometer comprises an optic fiber based probe that is coupled to a light source and a photo detector. FIG. 1 provides a highly schematic diagram of an example of the fiber optic probe of the invention illustrating the working principle of the device. Light 1 is propagated within the core 3 of the fiber according to a certain mode or plurality of modes and the difference in the refractive index between the core and the cladding 5 (having a lower refractive index) provides an interface that reflects the light therefore allowing light propagation by total internal reflection. Not all the light energy is confined in the core but a portion of energy of the propagated light travels in the cladding as an evanescent field 7.

In the fiber optic thermometer of the present invention, at least part of the cladding is replaced by a material 9 with a different refractive index. The evanescent field may propagate within the material and a portion of the light energy 11 may "escape" the fiber if the material is chosen such that its refractive index is high enough to reduce internal reflection. The material is chosen to have a refractive index that is sensitive to temperature variations. Therefore when light reaches the temperature-dependent refractive index material, part of the light power is lost in a proportion that depends on the temperature induced changes in the refractive index of the material. As a result, the variation in light intensity (power) can be measured and calibrated to correlate with and provide the temperature in the vicinity of the probe.

In one embodiment of the invention the fiber-optic probe functions in a reflective mode and the sensing portion is at one end (the tip) 13 of the fiber as shown in FIG. 1. In the reflective mode, the fiber is of the transmit/receive type and reflection of the propagated light is made possible by the presence of a reflective interface 15 at the end of the core. Temperature variations in the vicinity of the tip induce changes in the refractive index of the temperature-dependent refractive index material which result in loss of light power. Therefore only part of the transmitted light is reflected back at the reflective interface allowing a measurement of temperature.

The reflective interface can be created by depositing a material that will act as a reflector. For example the reflector may be chosen from various optical dielectric materials such as polymers, metal oxides and metals. Examples of material structures are periodic stacks of optical polymers and metal oxides (aluminium oxide, titanium oxide, tantalum oxide, and the like) with various thickness and refractive indexes. Alternatively some metallic materials, such as silver, gold and the like may be used for applications where electromagnetic interferences are not an issue.

In an embodiment of the invention the reflector may be chosen to exhibit properties allowing its detection and localization by imaging devices. For example a metallic object may give rise to "artefacts" in magnetic resonance imaging (MRI). Such artefacts may be localized with a fairly high degree of accuracy. Thus, the reflector in the fiber-optic probe of the invention may be chosen to have magnetic susceptibility sufficient to be tracked by MRI and therefore allow precise localization of the thermometer. Reflectors with other properties may be selected to enable other detection methods.

Figure 2:
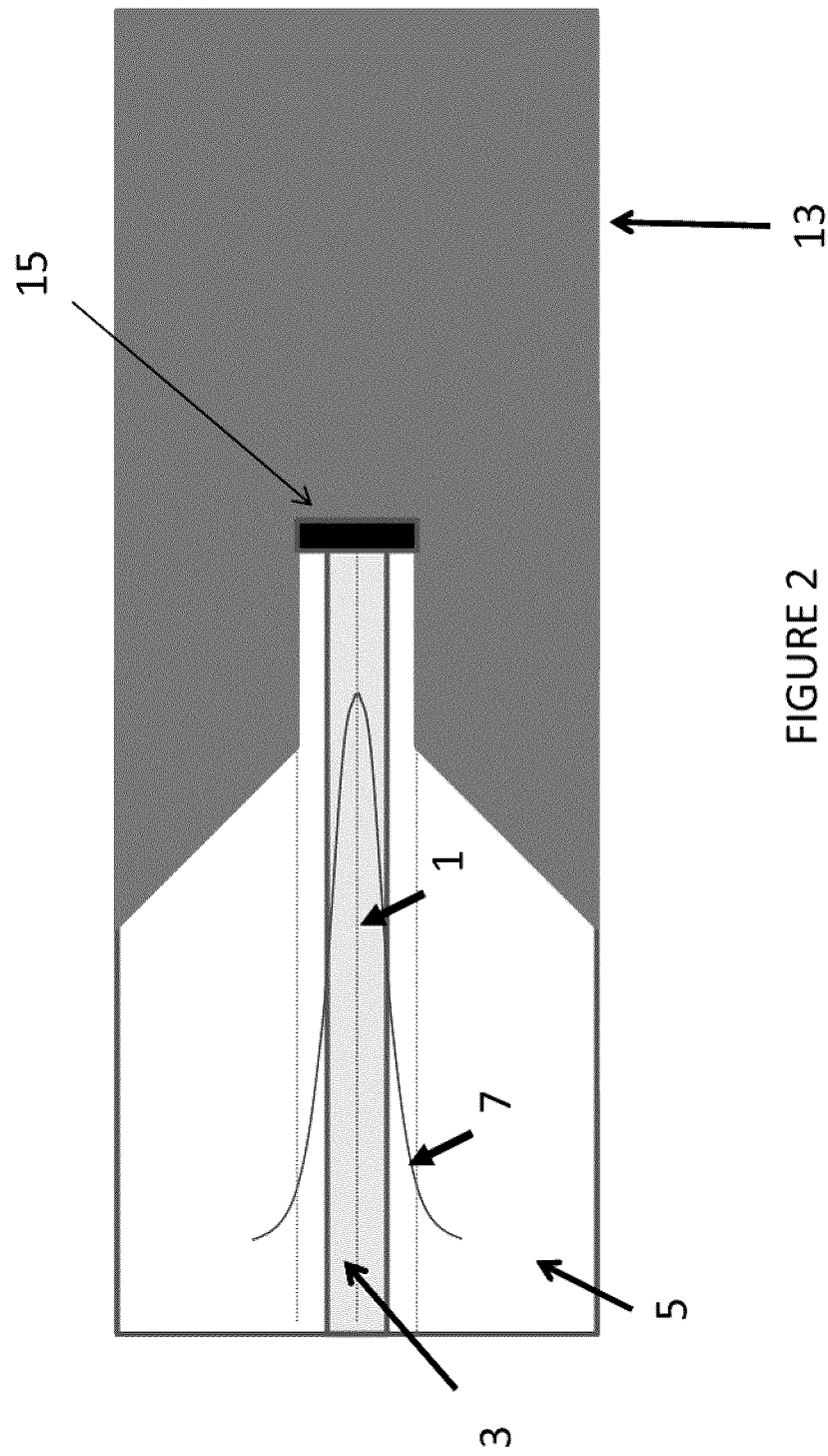
FIG. 2 shows a schematic cross-section representation of the fiber-optic probe in cone-shaped configuration.

The fiber-optic probe is shaped so that when coated with the temperature-dependent refractive index material the resulting geometry and refractive index properties enables a substantially adiabatic mode conversion of the light in the sensing portion of the probe so as to minimize unwanted reflection and loss of power not resulting from a temperature effect that could reduce the performance of the thermometer. In one embodiment, as exemplified in FIG. 2, the tip of the probe is tapered to a cone shape. It has been found that this geometry advantageously produces very good adiabatic parameters and thermometer performance, and it will be appreciated that other shapes are suitable to provide an adiabatic reduction of the diameter that avoids "steps" or abrupt changes that can create reflections. Reflections will reduce the signal to noise ratio. While it can be, the contour of the tip of the fiber after it has been coated with the temperature-dependent refractive index material need not be identical to the contour of the fiber before or after shaping by cladding removal. However the thickness and shape of the temperature-dependent refractive index material may influence the dynamic response of the thermometer to variations in temperature. For example, a thicker temperature-dependent refractive index material layer may result in a slower heat equilibration with the probed environment. Therefore these parameters should be selected with consideration of the intended use and desired dynamic response of the thermometer.

The temperature-dependent refractive index material may be selected from plastic materials such as silicone for example, Dow Corning® MS-1002 and Dow Corning® MS-1003, polysiloxanes, silicone curing gels, silicone thermosets and the like.

The choice of temperature-dependent refractive index material is dictated in part on the desired temperature sensitivity and range as well as dynamic response. In particular, the dependence of the refractive index (both real and imaginary, i.e. refraction and absorption) upon the temperature is one important criterion. For example, the material can be selected to exhibit a high refractive index value ($n_{max}$) which can be equal to or close to the refractive index of the core of the fiber at one, for example lowest, temperature T1 in range of interest (for the given type of application) and a low refractive index value ($n_{min}$) at another, for example highest, temperature T2 of the temperature range of interest. The entire range of light reflectivity variation (e.g., from 30 dB to approximately 0 dB) may be equally distributed over the total range of temperature variations of interest. For example, the choice of temperature-dependent refractive index material may provide a range of light reflectivity variation of 30 dB (30 dB at highest refractive index and 0 dB at lowest) for a 10° C. temperature range (e.g., from 35 deg C. to 45 deg C.). Thus, the 10° C. temperature variation would then generate 30 dB variation, and, the temperature sensitivity of the device could be 0.01° C. if the thermometer has a resolution of 0.03 dB. If, in another application, the temperature range (T1 to T2) is from 200 deg C. to 100 deg C., then a thermometer with a resolution as described above would provide 0.1 deg C. sensitivity (temperature resolving power). It will be appreciated that the light reflectivity variation (or attenuation) provided by a given temperature-dependent refractive index material may depend on temperature according to a particular function. It may sometimes be advantageous to select a material that will present a linear relationship in the desired range of temperatures.

Another selection criterion for the temperature-dependent refractive index material is the ease of manufacturing (production friendly character) such as the ease of deposition of the polymer material around the etched area of the fiber, by using such techniques as dip coating, spray, casting, printing and the like.

The choice of the temperature-dependent refractive index material preferably takes into consideration the intended use of the thermometer. For example if the thermometer is to be used in conjunction with instruments generating magnetic fields, avoidance of materials that have refractive index sensitive to magnetic fields is preferred.

Advantageously, the temperature-dependent refractive index material may be chosen to exhibit absorption properties so as to minimize heating of the surroundings of the thermo-sensitive region by the light escaping the fiber. Alternatively, a light absorbing substrate may be added around the thermo-sensitive region of the probe. However it will be appreciated that the absorption properties of the temperature-dependent refractive index material or the light absorbing substrate should be chosen to avoid heat accumulation in the probe unrelated to the temperature changes in the environment from which the temperature is being measured.

In an embodiment, the probe may comprise two or more sensing portions. Such a configuration may advantageously provide measurements of temperature at different locations along the probe. In this case, specific time delays or spectral selection may be used to identify the contributions of different zones.

The fiber of the probe may preferably be a single mode fiber since refraction and light propagation in such fibers are relatively insensitive to deformation (bending of the fiber) when compared to multimode fibers. Therefore, single mode fibers are preferable for certain applications requiring the probe to be bent in order to reach the desired location or to be inserted in flexible instruments such as catheters. However, multimode transmit/receive fiber-optic lines with substantially fixed geometry may also be used in applications where no deformation of the fiber is required or likely to occur.

Refractive properties of materials are generally dependent on the wavelength of the refracted light. Therefore, the bandwidth (spectrum) of the light source is preferably optimized to achieve a desired temperature sensitivity and resolution. This property may also be advantageously exploited in the thermometer of the present invention to measure temperature by comparing light intensity measurements at two or more wavelengths.

Figure 3:
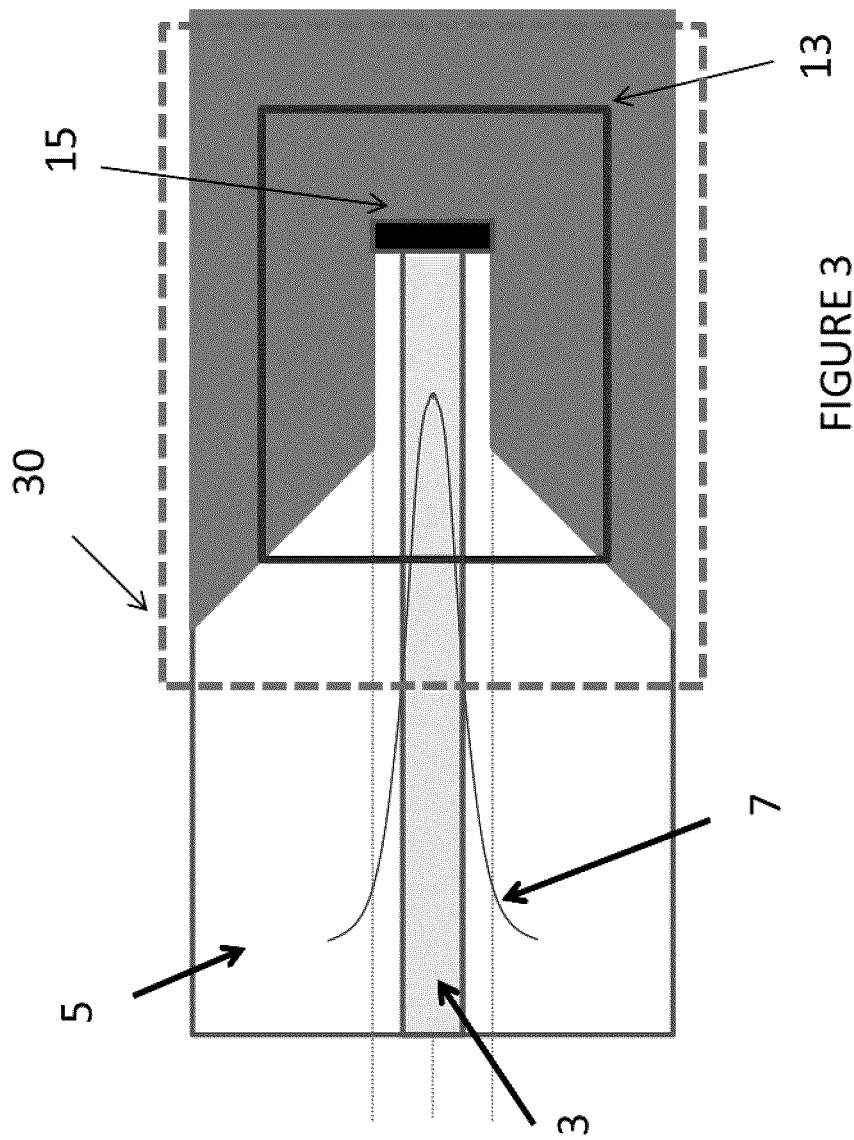
FIG. 3 shows a schematic cross-section representation of the fiber-optic probe in cone-shaped configuration with an optional protective seal.

When used in harsh environments, such as high or low pH, in the presence of certain chemicals or high humidity or when subjected to mechanical stress, the thermo-sensitive region(s) of the probe may be protected by additional layers of the temperature-dependent refractive index material or as seen in FIG. 3, by a substrate or chamber (seal) 30 exhibiting a heat conductivity compatible with the required temperature sensitivity of the thermometer so as to avoid heat insulation of the probe.

There is also provided a system for operating the fiber-optic probe of the invention. Referring to FIG. 4A, the fiber-optic probe comprising the sensing tip 13 can be connected to a fiber connector 40 to couple the fiber probe with a light source 42 which can be an LED, LD or the like, and a photo detector 44. In a preferred embodiment the probe is removeably coupled to the source/detector allowing the probe to be easily replaced. While not limited to medical applications, it will be appreciated that in this configuration the probe may easily be adapted to be disposable avoiding the necessity of repeated sterilization when the applications in which the probe is used requires sterile instruments. Optionally a stripper for cladding mode removal of the reflected light may be incorporated in the system.

Using circuitry, for example analog or digital circuitry, FPGA, DSP, a microcontroller or CPU, a correlator 45 controls the light source 42 and receives the signal from the photo detector 44 to compute the temperature T.

Figure 5:
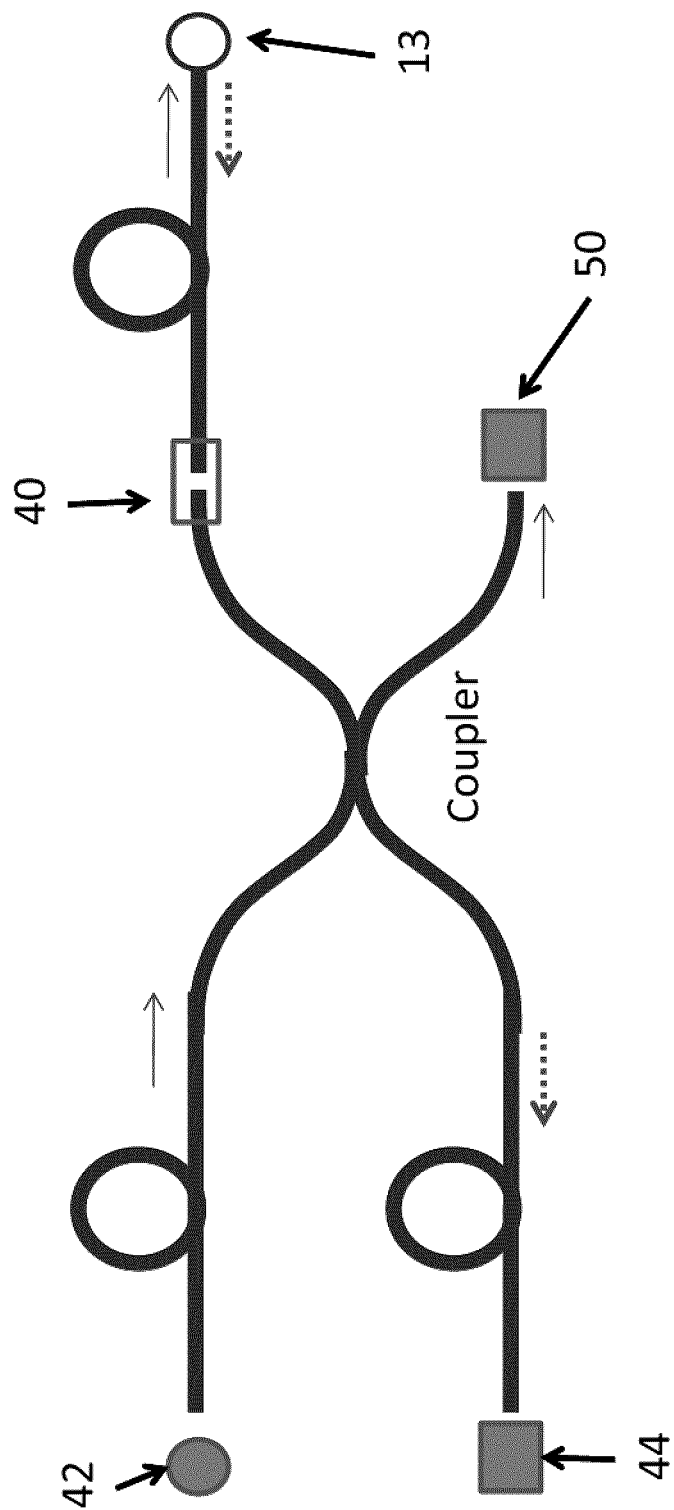
FIG. 5 shows a schematic representation of an example of a calibration configuration of the thermometer.

The thermometer may be pre-calibrated or it may comprise a temperature controlled chamber 46 to perform "in-place" calibration, as shown in FIG. 4B. The thermometer can also be used in relative changes mode by measuring relative changes in reflected light power and therefore provide measurements of temperature differences. With reference to FIG. 5, there may also be provided a light detector 50 coupled to the light source to calibrate the source.

While one fiber may be used as a temperature probe, a bundle of fibers of approximately same length may also be used to probe a temperature distribution in a plane or in a 3D space. The fibers in a bundle of fibers may each be connected to their own light source and photodetector. Alternatively the fibers may be interconnected via, for example, a star coupler or a tree coupler type device or similar coupling devices as would be known in the art and the interrogation of different sensing fiber-heads may be done with the same interrogation (light source/photodetector) system.

Alternatively, the bundle of fibers, in the bundle of fibers arrangement described above, may comprise fibers of different lengths to probe different positions in space, such as different containers, or different positions within an object or sample.

In a further aspect of the invention there is provided a process by which the optic fiber probe can be manufactured.

Figure 6:
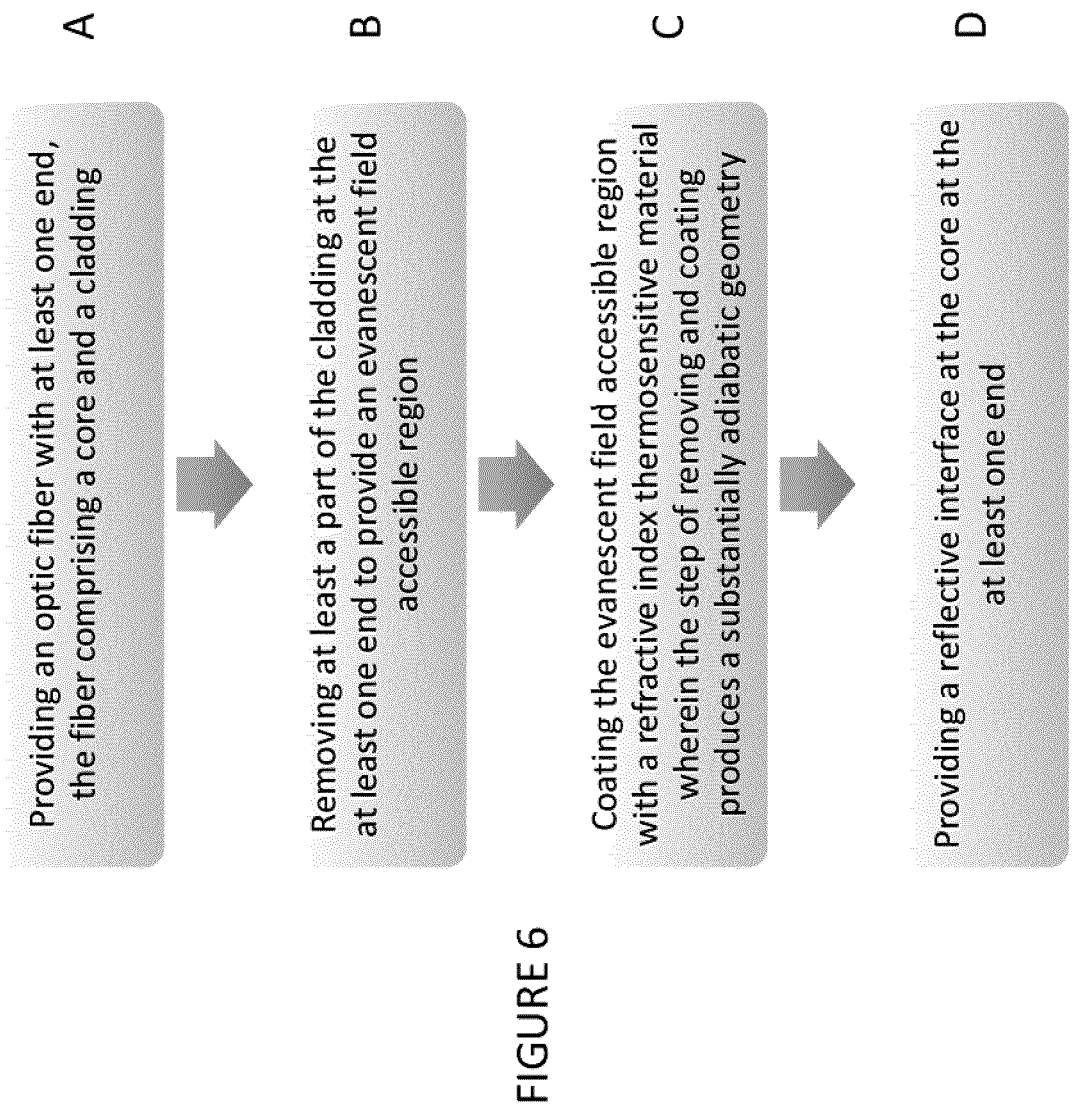
FIG. 6 shows a flowchart of an example of a process to manufacture the fiber-optic probe.
Figure 8A:
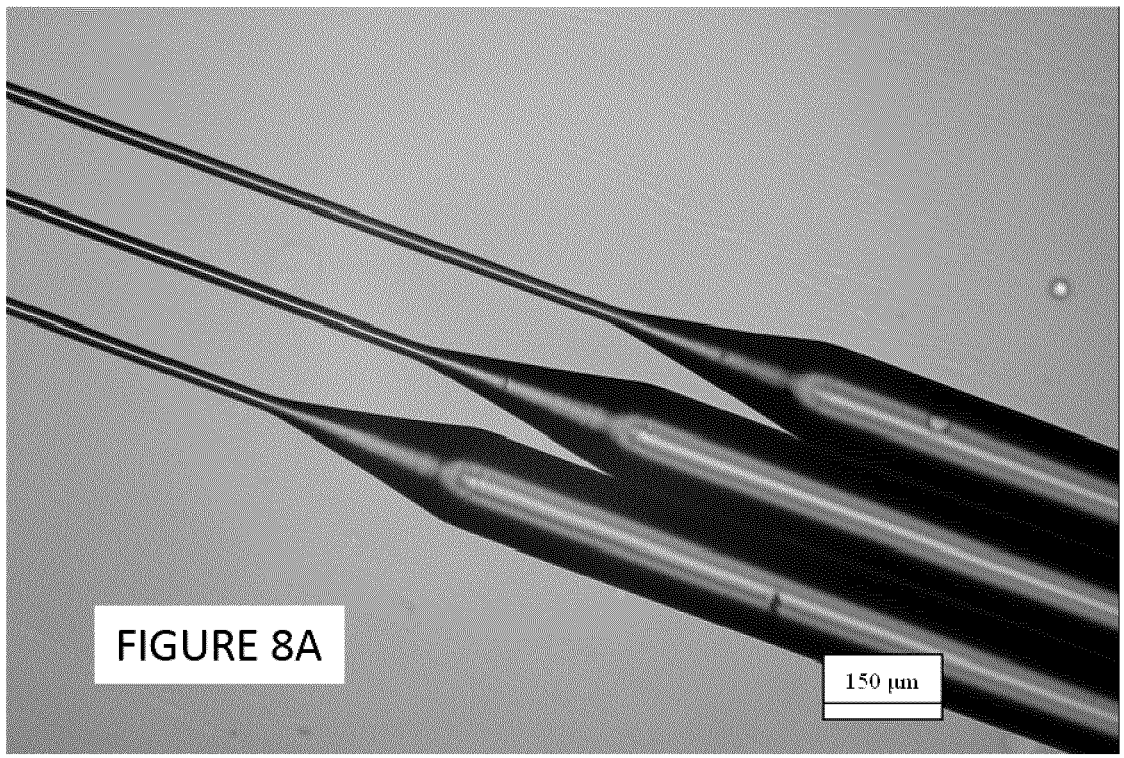
FIGS. 8A and 8B show microscope pictures of etched fibers at a first and a second dipping time, namely
Figure 8B:
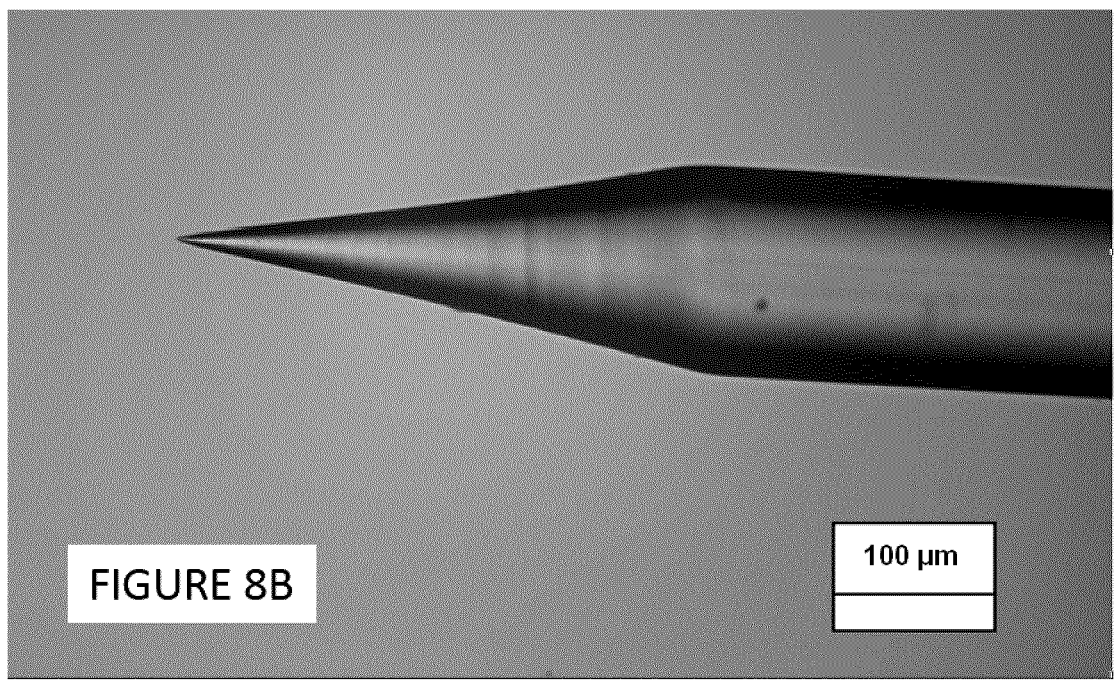

With reference to FIG. 6 an end of an optic fiber at A can be treated to remove at least part of the cladding to produce an evanescent field accessible region (B). It will be appreciated that the structure of a common fiber may also comprise a buffer and a jacket which would be removed in the desired portion of the fiber to access the cladding. At C the evanescent field accessible region is coated with a refractive index temperature sensitive material which is optically coupled with the core and/or the cladding in a way that at least a portion of the evanescent tail of the propagated light can reach the temperature sensitive material. At D a reflective interface is provided at the end of the core so that at least part of the light propagated in the core is reflected back.

Figure 9:
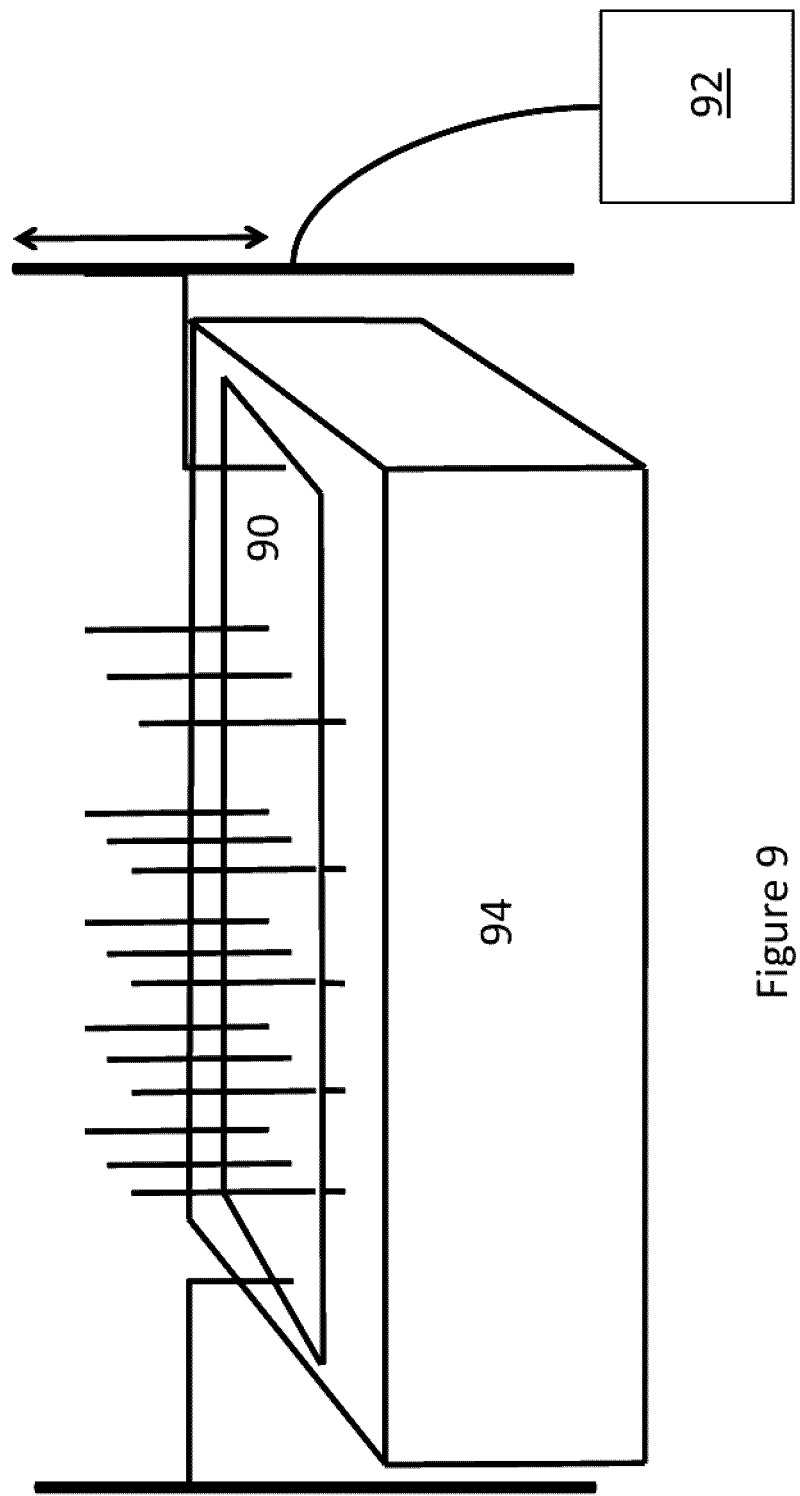
FIG. 9 shows an example of a motorized dipping system for removal of cladding.
Figure 10A:
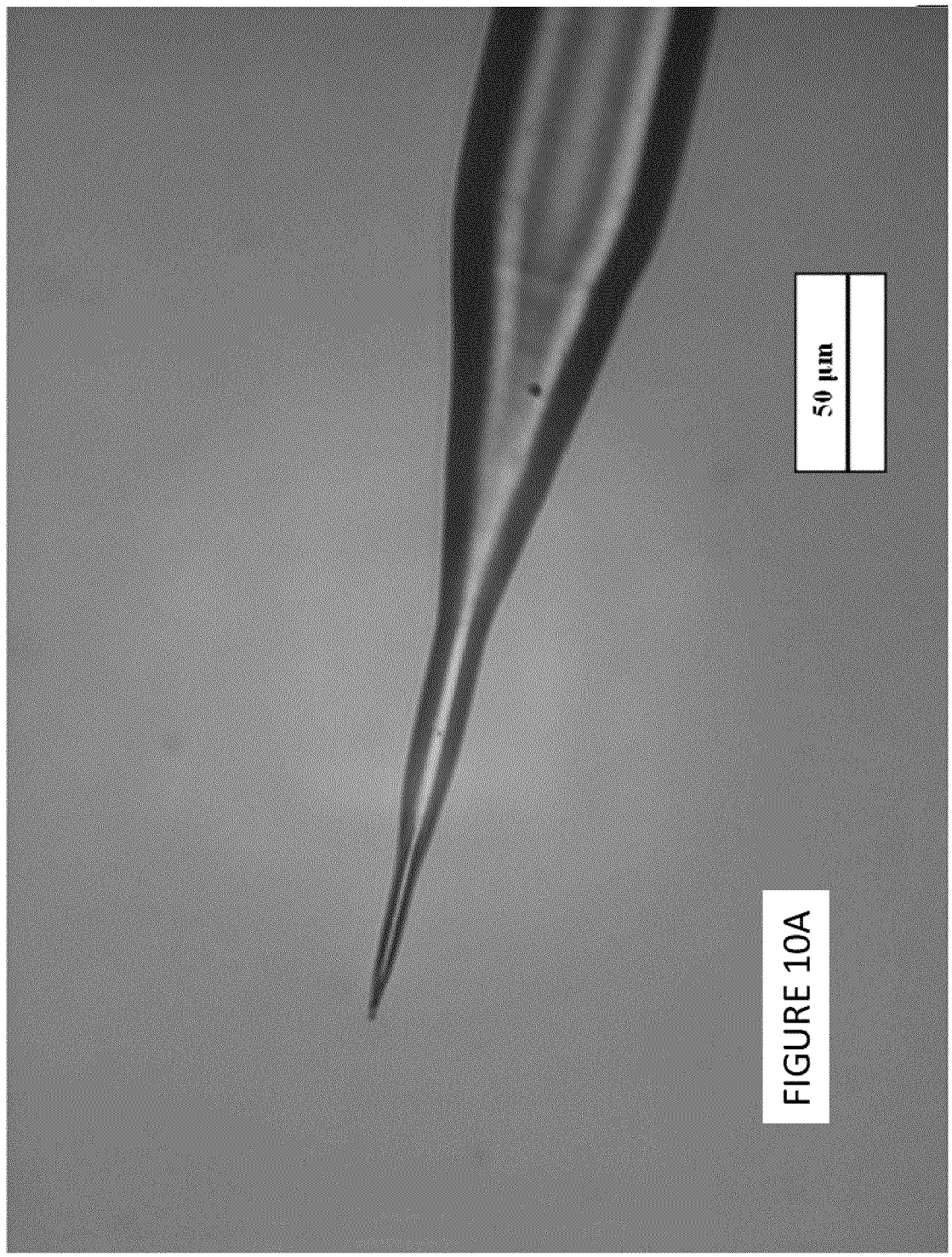
FIGS. 10A and 10B show microscope pictures of fibers etched with time-controlled dipping in HF solution, namely
Figure 10B:
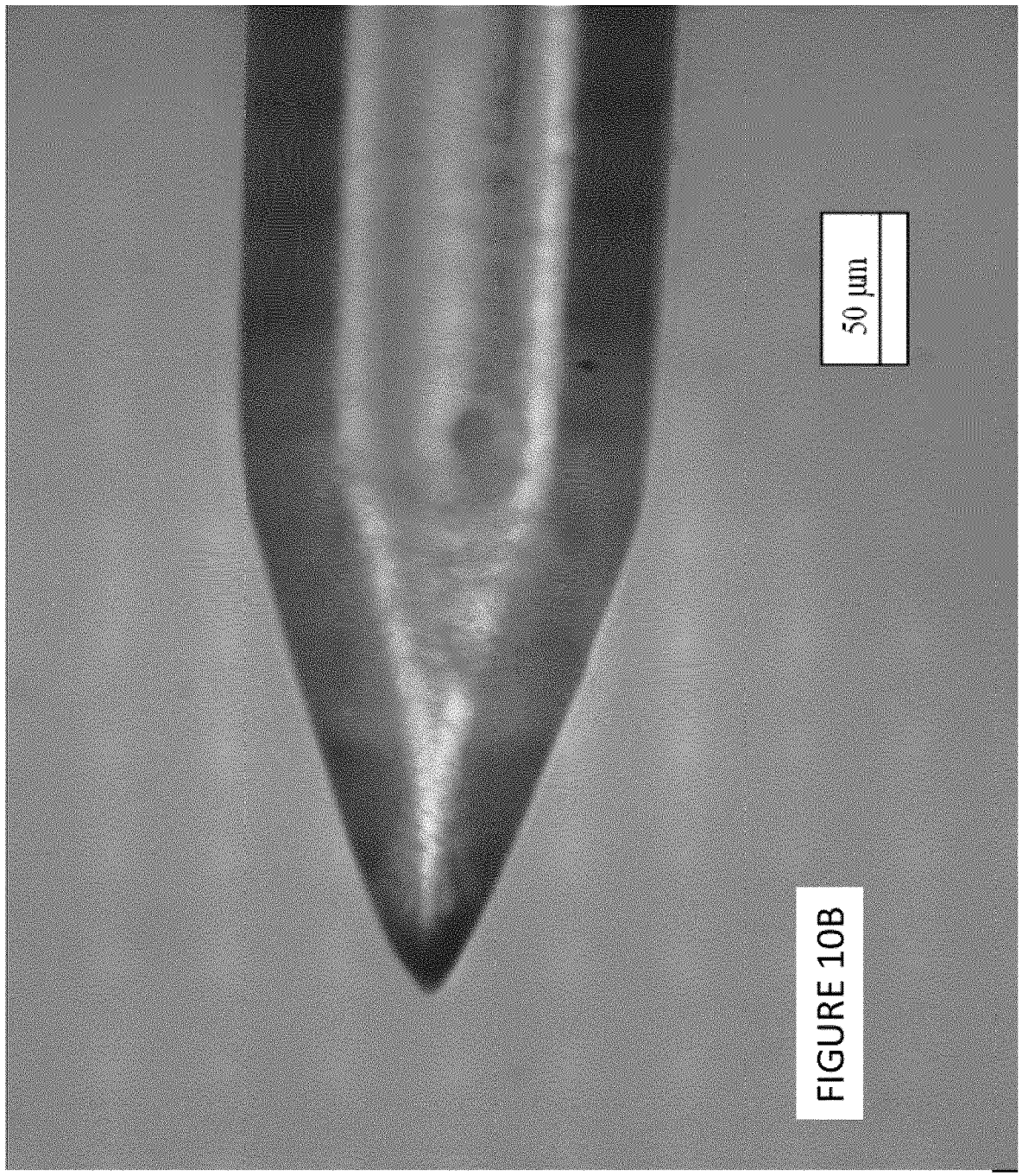

Removal of the cladding may be achieved by known method such as etching (chemical, photo-assisted etching), polishing, tapering, sand blasting, laser removal, laser-exposition followed by chemical etching, or any other technique that would be known in the art. In one embodiment of the invention a substantially adiabatic fiber geometry is obtained by dynamic or static dipping of an end of the fiber in an etching solution, such as an acid solution, for example hydrofluoric acid, to produce a substantially conic shape. For example, with reference to FIGS. 7A, 7B, 8A and 8B a desired shape may be obtained by dipping in approximately 40% to 50% HF at 20° C. An oil is used to protect the fiber where the acid solution should not be active for etching purposes. A predetermined shape (such as a cone shape) can be achieved by displacing the fiber at a predetermined speed in the acid, for example using a motor-controlled dipping system as shown in FIG. 9 where an example of a motorized dipping system having a fibers-receiving platform 90 connected to a motor control unit 92 capable of displacing the platform into the etching solution container 94 with sub-millimeter displacement precision is shown. In the particular example of FIGS. 10A and 10B the speed is 5 µm/min. By doing so the tip of the fiber will spend the most time in the etching medium and therefore has the most cladding removed (producing smallest diameter) and the exposure time is gradually reduced for portion of the fiber away from the tip. It will be appreciated that the speed may be varied depending on the desired shape. This approach has been surprisingly found to produce a substantially adiabatic geometry. Furthermore it provides for a mean to process a large number of fibers simultaneously. For example a multifiber support can be provided that can be motor controlled allowing controlled dipping of the fibers in the etching solution.

After the etching step, a temperature-dependent refractive index material may be deposited to coat all or part of the etched section of the fiber. Various coating techniques, known in the art, may be used such as dip coating, evaporation, casting, printing, chemical deposition, electro deposition, immersion and the like. The temperature-dependent refractive index material, once coated, may be shaped or cured to achieve a desired external profile and thickness to provide a desired thermometer dynamic response.

For use in harsh environment, it is possible to add a protective substrate on the temperature-dependent refractive index material. Alternatively, the probe could be contained in a protective chamber which would be heat exchange coupled to the environment from which temperature measurements are to be taken.

Figure 11A:
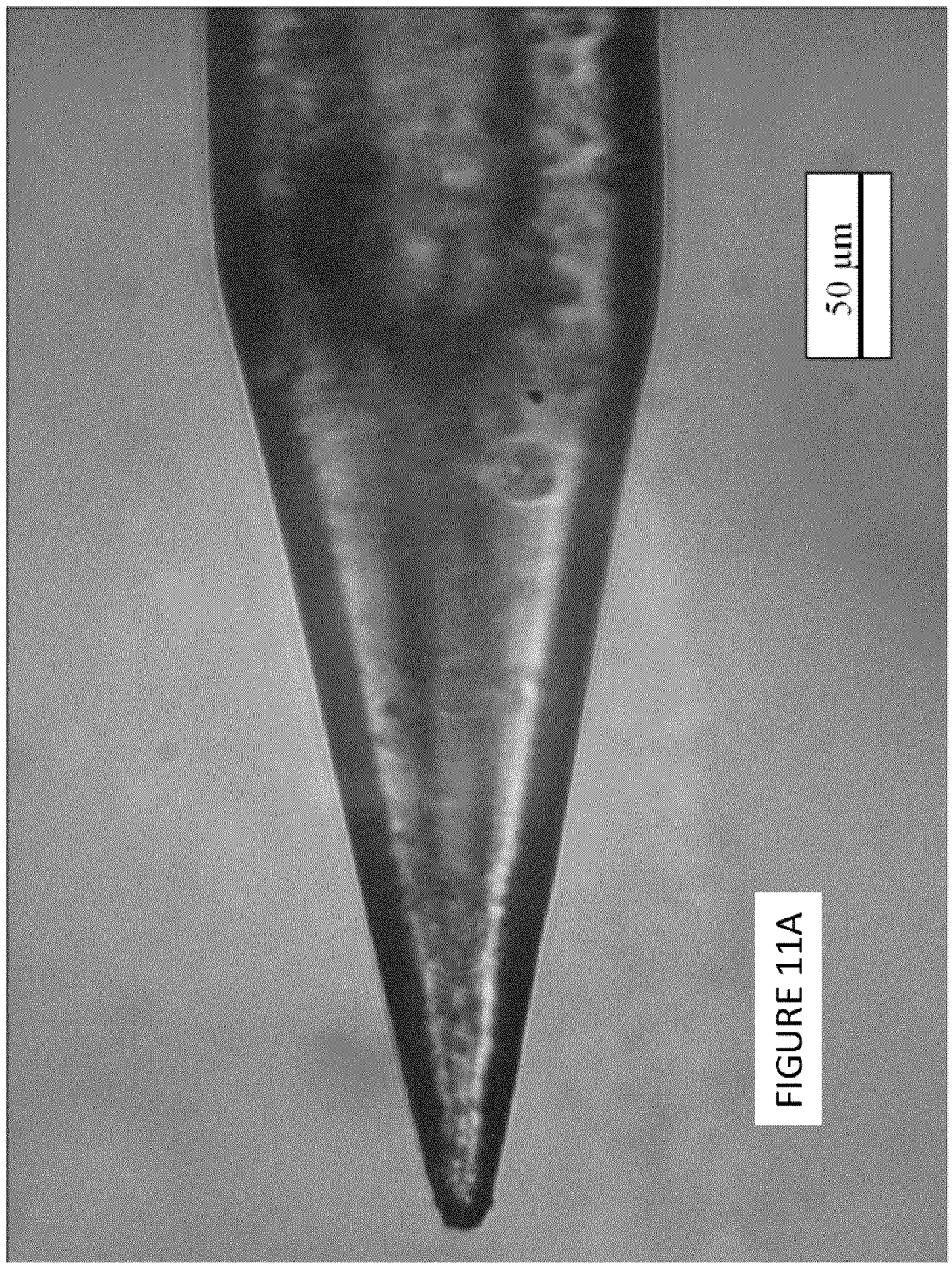
FIGS. 11A and 11B show microscope pictures of etched fibers before and after deposition of a dielectric reflector.
Figure 11B:
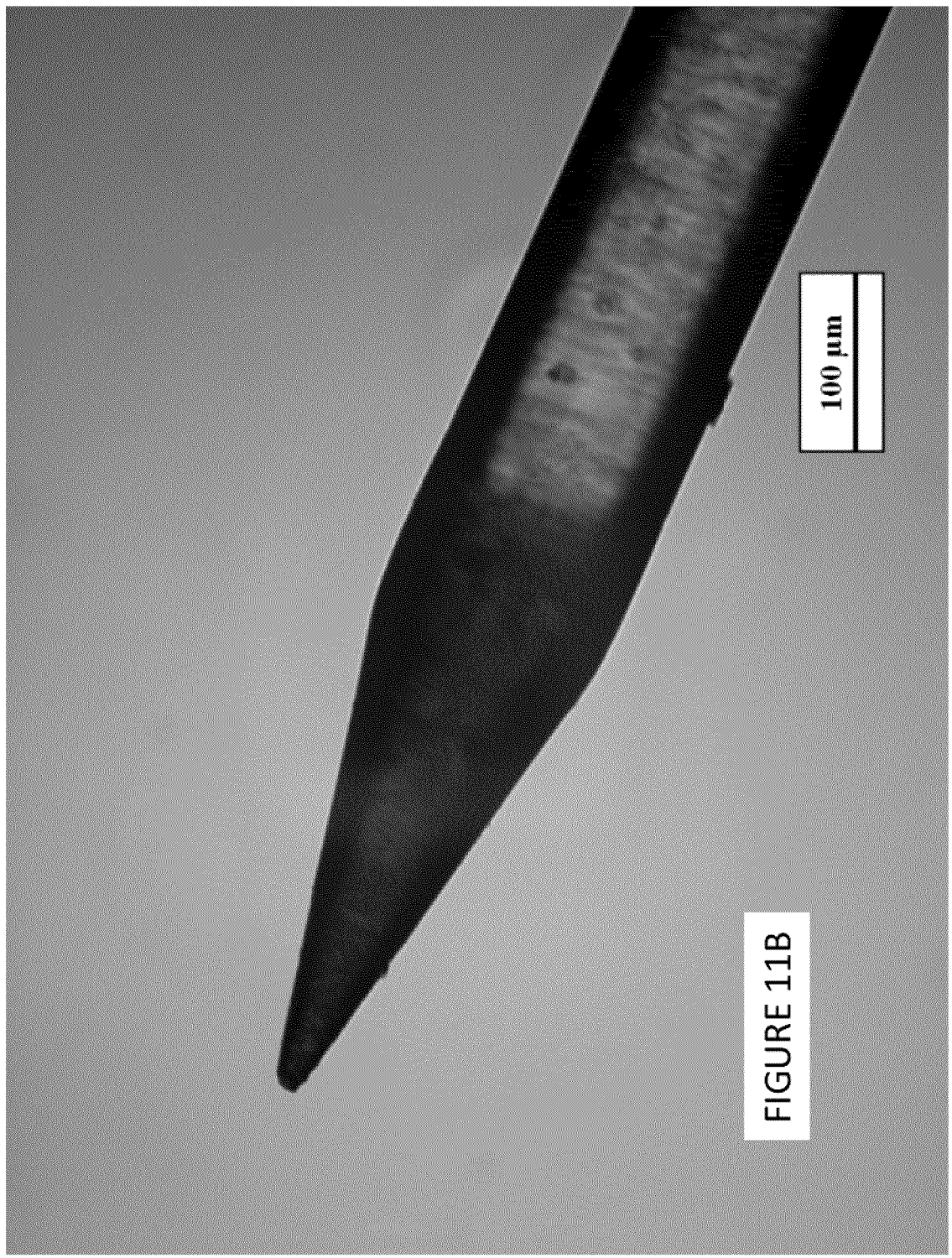

A reflective interface at the end of the core can be provided by depositing a reflective material either after the cladding removing step (FIG. 11A) or after the coating with the temperature-dependent refractive index material (FIG. 11B). If the reflective material is added after the coating step, part or all of the coating may be removed near the end of the core to allow deposition of the reflective material to produce the desired reflective properties. Method for depositing dielectric materials are known in the art such as Chemical Vapour Deposition (CVD), thermal evaporation, electron beam evaporation, sputtering, dip coating, and the like. During deposition, the temperature-dependent refractive index material may be protected by a mask for example with tin foil that would allow only the desired portion of the fiber to be exposed. Alternatively, the fiber may be metalized first, then cleaved. The metalized part of the fiber may then be connected to an electrical potential and deposition of the reflective material at the end (where the fiber was cleaved) may be effected using charged ions. Thus the reflective material will be selectively deposited on the part of the fiber at the tip (cleavage site) not covered by metal while the charged metalized part prevents the deposition of the material on the periphery of the fiber. Once the deposition of the reflector is finished, the metal area may be etched first and then the fiber cladding may be partially removed (by methods described above) to obtain the desired shape.

FIG. 12A illustrates an example of reflective material deposition using CVD. The fibers having a cladding 5 and core 3 are depicted in a vapour deposition chamber 110 having a gas inlet 112 and an outlet 114. A mask 116 allows the selective exposition of the tip of the fiber for deposition of the reflective material 118. FIG. 12B illustrates the fibers after deposition.

For some applications a core to air interface may provide sufficient reflective power to enable to optical thermometer to function.

Figure 13:
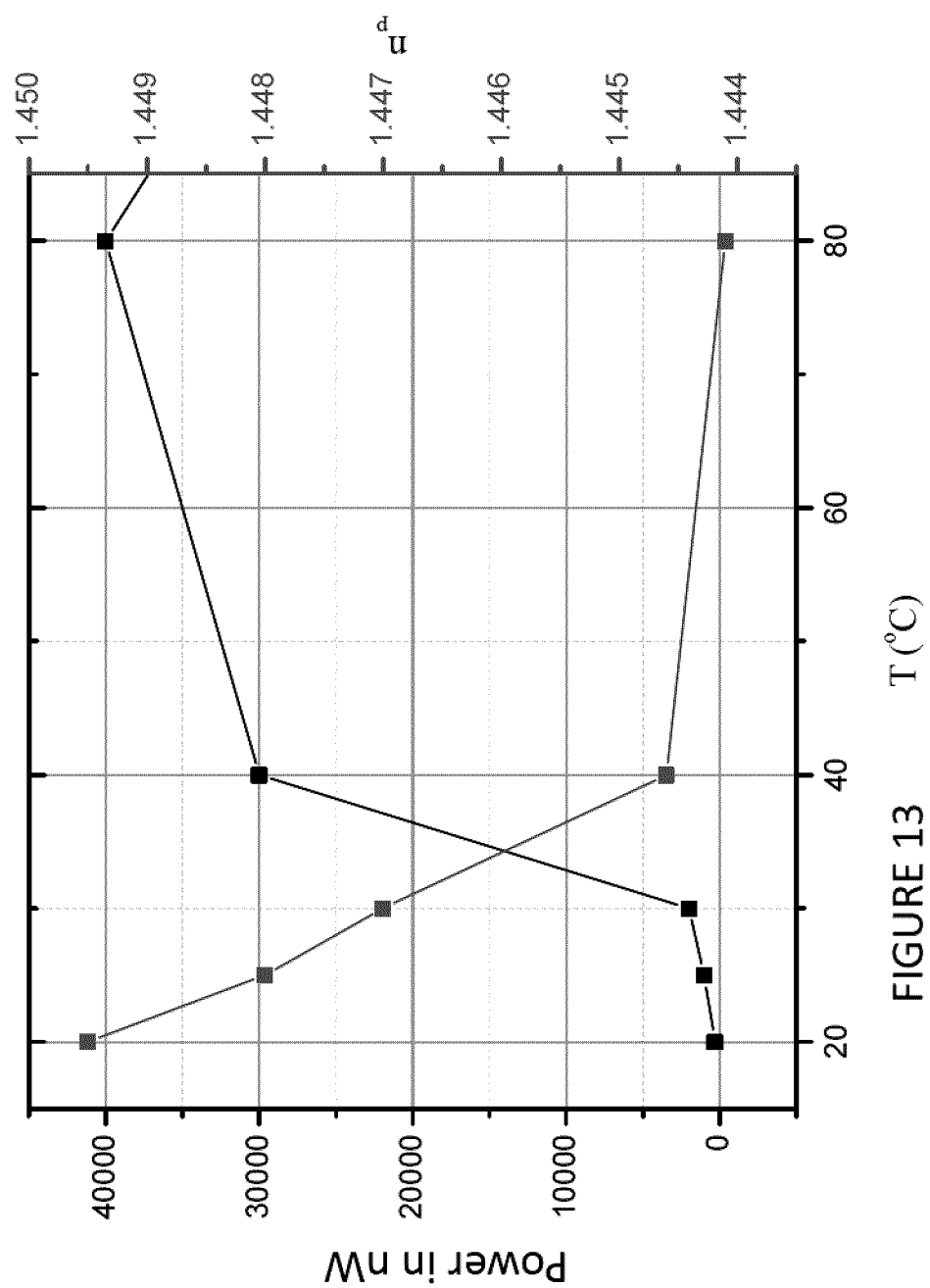
FIG. 13 shows a graph of the dependence of the reflected optical power (left vertical axis) and independently measured temperature-dependent refractive index material's refractive index $n_p$ value (right vertical axis) upon the environmental temperature.

Temperature measurements obtained using a probe of the present invention are shown in FIG. 13 in which the dependence of the reflected optical power (left vertical axis) and independently measured polymer's refractive index $n_p$ value (right vertical axis) upon the environmental temperature is shown. Light reflection is increasing when the temperature increases (reducing the refractive index of the temperature-dependent refractive index material that is surrounding the fiber).

The temperature resolution of the fiber-optic thermometer of the invention is dependent on the refractive index variations of the temperature-dependent refractive index material as a function of temperature. Typical temperature resolution of the order of 0.01° C. can be achieved. Because of the size of the temperature sensitive head of the probe, excellent spatial resolution of the order of 0.3 mm can be achieved.

The measured reflected signal will depend on the intensity and wavelength stability of the light source, the coupling efficiencies, and losses in the fiber other than material 9. The calibration mentioned above is able to compensate for these dependencies in most circumstances. For example, using a single mode fiber can reduce losses due to bending of the fiber, however, some losses are encountered, particularly when bending in increased. However, other calibration techniques are possible.

Figure 14A:
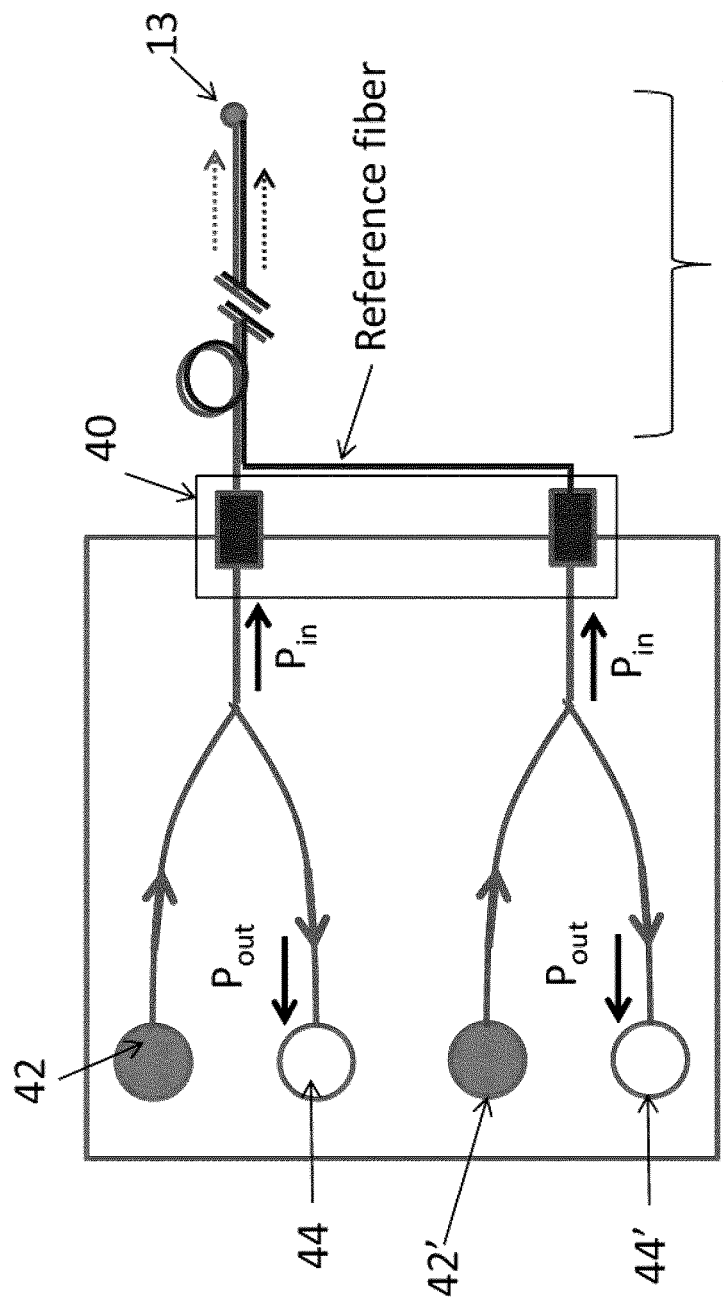
FIG. 14A shows a schematic diagram similar to FIG. 4A with an addition of a reference fiber.
Figure 14B:
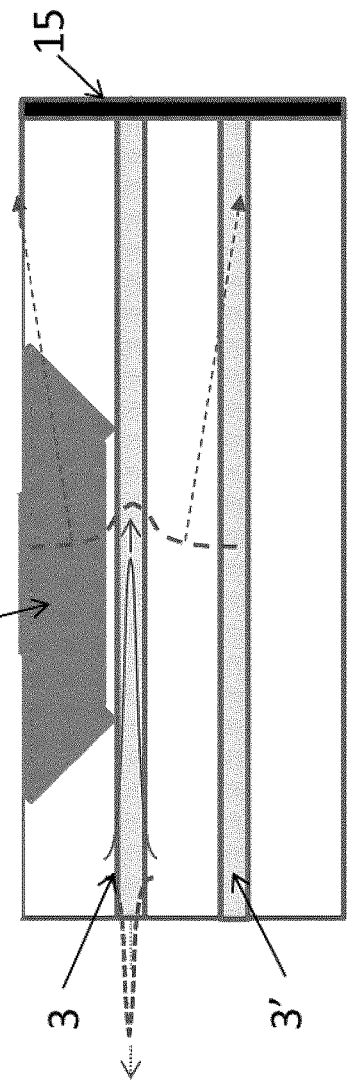
FIG. 14B shows a sectional view of a probe tip having a dual core fiber providing a probe core and a reference core.

With reference to FIG. 14A, the probe fiber is bundled with a calibration or reference fiber that has no region of thinned cladding and temperature dependent material 9, and can be used to measure reflected signal in parallel with the signal reflected from the temperature probe fiber. The arrangement can be two separate fibers bonded together with an adhesive or common sleeve, with one fiber being prepared as described above and another that is prepared to have an end reflector only. Alternatively, a dual core fiber can be polished on one side only as illustrated in FIG. 14B, where the second, reference waveguide core 3' does not have a thinned cladding and material 9, so that its reflection is not affected by temperature. Polishing or local etching of the cladding to have the desired profile can be done using conventional techniques, however, the dual core fiber is held so that the side of the cladding nearest the selected core is thinned.

As illustrated in FIG. 14A, two sources 42 and 42' can be coupled independently into respective fibers/cores. The two sources 42 and 42' can be at the same wavelength so that bending losses are essentially the same for the two cores/fibers. Alternatively, the same source 42 can be coupled into both the probe fiber/core and the non thermo-sensitive fiber/core. In this way, the measured reflection can take into account variations in the source 42, if present. FIG. 14A also shows separate detectors 44 and 44'. Likewise, alternatively, a single detector 44 can be coupled to receive light from both of the thermally sensitive fiber/core and the non-thermally sensitive fiber/core, and detection can either be discriminated time-multiplexing, spectrally or by the frequency of source modulation.

When losses due to fiber bending are significant, such as in the case of a multimode fiber or extreme flexion in the case of a single mode fiber, such losses are wavelength dependent, and two or more wavelengths can be used to determine bending losses by comparing reflection at different wavelengths.

Figure 15:
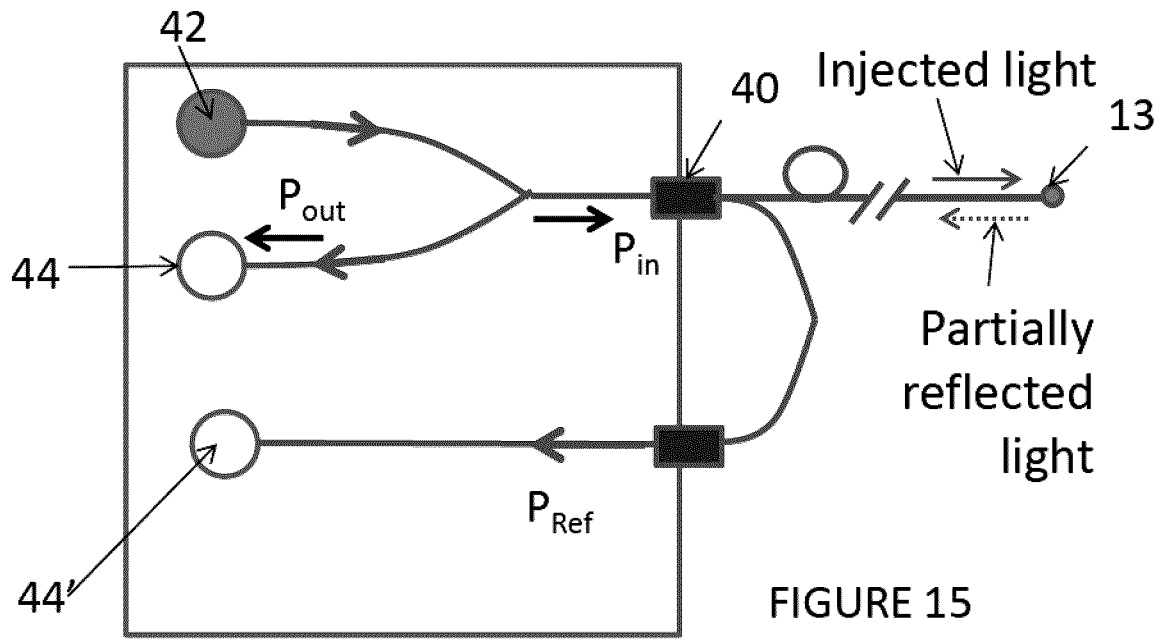
FIG. 15 is a schematic diagram of an embodiment having a calibration system coupled to the temperature sensing fiber for measuring an intensity of light injected into the sensing fiber.

With reference to FIG. 15, the source can be calibrated using a coupler that splits the injected power into the light transmitted down the probe fiber and into a second detector. As will be appreciated by those skilled in the art, the directional couplers used allow the second detector 44' to receive a part of the light transmitted into the probe fiber, while the reflected signal in the probe fiber is coupled essentially exclusively to the detector 44.

Figure 16:
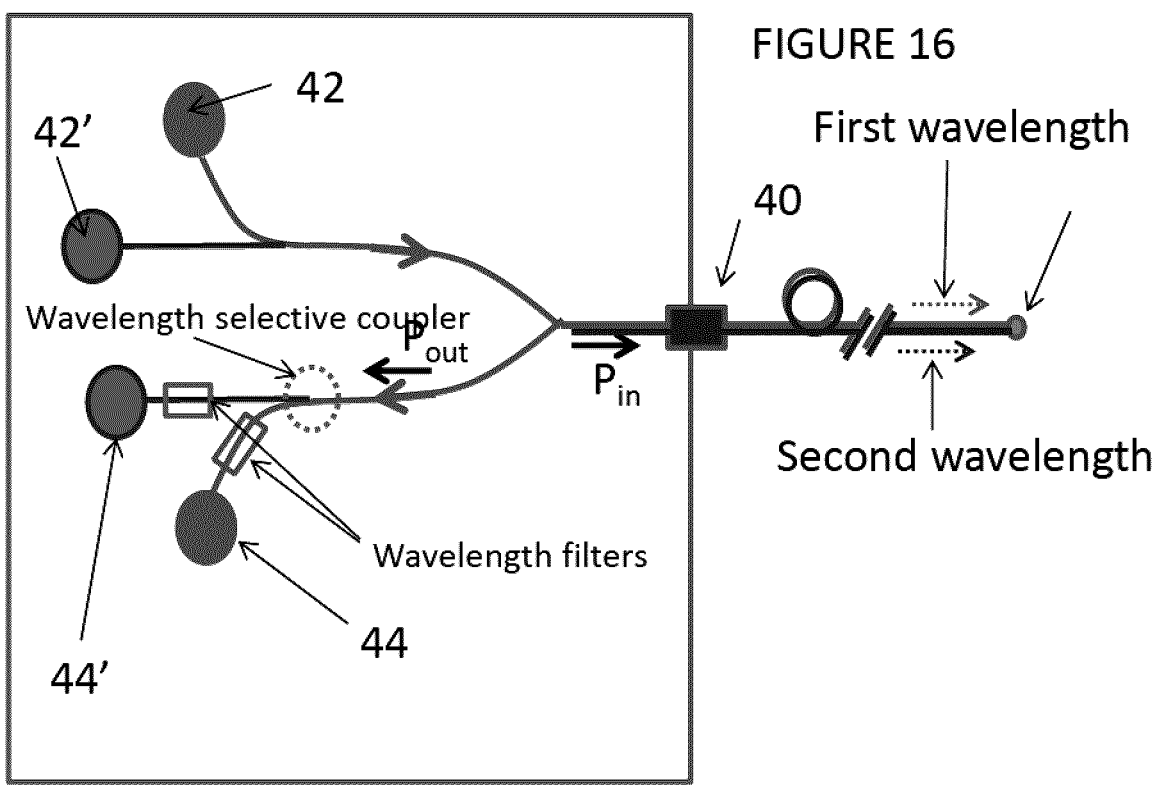
FIG. 16 is a schematic diagram of an embodiment having a calibration wavelength source and detector coupled into the probe fiber.

As shown in FIG. 16, in the case that the thermally sensitive material 9 has a measurable change in index of refraction for different wavelengths, a second, different wavelength, light source 42' (or a tunable light source for both wavelengths) can be used with a detector 44' (or alternatively a common detector) to measure light reflected at two wavelengths where the reflection characteristics are different as a function of temperature. Since the two wavelengths are coupled into the same probe fiber, suitable wavelength selective couplers can be used to couple the light into the fiber, and suitable wavelength selective couplers can be used to extract light from the probe fiber for directing each wavelength onto the detectors 44 and 44'. When using common sources and/or detectors, time-multiplexing can be used.

Here, it is preferable that the change in temperature dependent index of refraction as a function of wavelength is much greater than the change of bending losses as a function of wavelength, at least in the case that bending losses are an issue. Thus, the light source can be two LED's or laser diodes coupled into the same fiber at a modest additional cost to the source/detector unit, and no additional cost to the probe unit. The detector can be chosen to be common for the two wavelengths. By comparing reflection at each wavelength, coupling efficiency and fiber transmission losses can be compensated.

What is claimed is:

1. A fiber-optic thermometer probe comprising:
a single mode optical fiber having a sensing portion with a region of reduced cladding thickness coated with a temperature-dependent refractive index material to provide non-interferometric variations in propagated light power upon changes in temperature in a vicinity of the sensing portion;
and a single reflective interface optically coupled at an end of a core of the single mode optical fiber at or after the sensing portion to reflect light propagated therein.

2. The probe of claim 1, wherein the sensing portion and reflective interface are at an end of the single mode optical fiber.

3. The fiber-optic thermometer of claim 1, wherein the region of reduced cladding and temperature-dependent refractive index material together provide a geometry and optical properties enabling a substantially adiabatic mode conversion of the propagated light.

4. The fiber-optic thermometer probe of claim 3 wherein the cladding at the region of reduced cladding is cone-shaped to provide gradual cladding thickness tapering.

5. The fiber-optic thermometer probe of claim 1 wherein the temperature-dependent refractive index material is light absorbing.

6. A fiber-optic thermometer comprising:
one or more single mode optic fiber probe according to claim 1,
a photo detector and a light source configured to be coupled to the one or more single mode optic fiber probe; and
a light power to temperature correlator configured to receive a signal from said photo detector and to provide a reading of temperature in an environment of said sensing portion.

7. The fiber-optic thermometer of claim 6 further comprising a calibration light detector configured to be coupled to receive light transmitted from said source into said optic fiber probe, wherein said correlator is configured to use a signal from said calibration light detector to compensate for variations in said light source.

8. A fiber-optic thermometer probe comprising:
an optical fiber having a sensing portion with a region of reduced cladding thickness coated with a temperature-dependent refractive index material to provide non-interferometric variations in propagated light power upon changes in temperature in a vicinity of the sensing portion; and a single reflective interface optically coupled at an end of a core of the optical fiber at or after the sensing portion to reflect light propagated therein, wherein the reflective interface has a magnetic susceptibility and is detectable by magnetic resonance imaging.

9. The fiber-optic thermometer probe of claim 8 further comprising a reference waveguide bundled with said optical single mode fiber having a sensing portion, said reference waveguide having a reflective interface optically coupled to a core of the reference waveguide to reflect light propagated therein without said sensing portion, said reference waveguide comprising one of: a second core of a dual core fiber whose first core provides said optical fiber having a sensing portion; and a separate reference optical fiber.

10. A method for making a fiber-optic thermometer probe comprising:
a. providing a single mode optic fiber with at least one end, the fiber comprising a core and a cladding,
b. removing at least a part of the cladding in a sensing portion at or before the at least one end to provide an evanescent field accessible region,
c. coating the evanescent field accessible region with a temperature-dependent refractive index material to produce a non-interferometric sensing portion wherein the step of removing and coating produces a substantially adiabatic geometry,
d. providing a single reflective interface at the core at the at least one end at or after the sensing portion.

11. The method of claim 10 wherein the step of providing a single mode optic fiber with at least one end comprises a step of cleaving the single mode optic fiber at a predetermined cleavage point.

12. The method of claim 11 wherein prior to cleaving, a predetermined portion of the fiber is metalized.

13. The method of claim 10 wherein the step of removing is selected from chemical etching, photo-assisted etching, polishing, tapering, sand blasting, laser removal, and laser-exposition followed by chemical etching.

14. The method of claim 10 wherein the step of removing is chemical etching and the step of chemical etching comprises treatment of the single mode optic fiber with an acid solution.

15. The method of claim 10, wherein the step of removing is controlled to produce a cone shaped tip at the at least one end.

16. The method of claim 10, wherein said removing is performed simultaneously on a plurality of fibers.

17. The method of claim 16, wherein the chemical etching comprises a motor-controlled dipping step to produce a predetermined etching profile.

18. The method of claim 10, wherein the step of providing a reflective interface comprises depositing a reflective material at the core of the at least one end, said depositing is selected from Chemical Vapour Deposition (CVD), thermal evaporation, electron beam evaporation, sputtering, dip coating.

19. The method of claim 18, wherein the optic fiber is masked above the at least one end so as to provide a predetermined deposition surface.

* * * * *